United States Patent [19]

Cohee

[11] 4,218,840
[45] Aug. 26, 1980

[54] ICE FISHING LINER

[76] Inventor: Robert J. Cohee, 13562 Horrell Rd., Fenton, Mich. 48430

[21] Appl. No.: 971,336

[22] Filed: Dec. 20, 1978

[51] Int. Cl.² ............................................. A01K 97/01
[52] U.S. Cl. ................................................. 43/4; 16/2; 16/108; 405/52; 405/61
[58] Field of Search .................. 16/1, 2, 108; 206/276; 131/174, 175; 138/32, 90, 96 R; 43/4, 5, 1; 405/61, 52

[56] References Cited

U.S. PATENT DOCUMENTS

| | | | |
|---|---|---|---|
| 2,594,680 | 4/1952 | Rehfeld | 131/175 |
| 3,056,272 | 10/1962 | Eilers | 43/4 X |
| 3,351,974 | 11/1967 | Wilhelmi | 16/2 |
| 3,424,856 | 1/1969 | Goldren | 16/2 X |
| 3,466,781 | 9/1969 | Nelson et al. | 43/4 |
| 3,826,040 | 7/1974 | Roberts et al. | 16/2 X |
| 3,836,698 | 9/1974 | Bawa | 16/2 X |
| 3,895,409 | 7/1975 | Kwatonowski | 16/2 |
| 4,081,879 | 4/1978 | Rubright | 16/2 |

Primary Examiner—C. J. Husar
Assistant Examiner—Moshe I. Cohen
Attorney, Agent, or Firm—Learman & McCulloch

[57] ABSTRACT

A liner adapted for insertion in an opening formed in ice on the surface of a body of water comprises a generally cylindrical body having at one end a peripheral flange. The body and the flange are slotted to enable the diameter of the body to be reduced for insertion in the opening, and the material from which the liner is made is sufficiently resilient to enable the body to expand into engagement with the side of the opening following insertion.

9 Claims, 5 Drawing Figures

ICE FISHING LINER

BACKGROUND OF THE INVENTION

Preparatory to ice fishing it is necessary for the fisherman to bore or chop an opening through ice on the surface of a body of water. If the opening is chopped, the edges of the opening quite often are irregular or rough. If the opening is bored, that portion of the opening above the water level (usually about four inches) becomes rough due to splashing and freezing of water within the opening. In either event, the rough edges often result in loss of a hooked fish when it is attempted to raise the fish through the opening.

After an opening has been formed in a layer of ice, it is customary for a fisherman to return periodically to the site of the opening. Quite often, however, water contained in the opening refreezes, thereby necessitating rechopping or reboring of the opening. In these operations ice removed from the opening often is deposited on the surface on the ice adjacent the opening, thereby resulting in the formation of a mound or rim about the periphery of the opening. This, in effect, increases the thickness of the ice, thereby increasing the opportunity for loss of a hooked fish.

When the formation of an opening in a layer of ice has been completed and the fisherman is fishing through the opening, it is not uncommon for snow to be blown into the opening by the wind. This results in a slushy accumulation of snow and ice in the opening, thereby promoting freezing of the water in the opening.

An object of this invention is to provide a liner for an ice fishing opening formed in a layer of ice and which to a large extent minimizes the characteristics referred to above.

SUMMARY OF THE INVENTION

A liner constructed in accordance with the invention comprises a generally cylindrical sleeve or body terminating at one end in a radially extending flange, both the body and the flange being slotted. The liner preferably is formed from a petroleum based plastic material of known kind which inhibits the adherence of ice thereto, and the material is of such resiliency as to enable both the liner and the flange to be flexed radially inwardly and reduce the liner's diameter to facilitate insertion of the body into the opening formed in the ice. Upon insertion of the body in the opening, the resilience of the liner's material enables it to expand radially into engagement with ice at the edge of the opening. The inner surface of the body preferably is smooth, and its outer surface preferably is provided with ribs which bear against the ice at the edge of the opening so as to minimize the possibility of the liner's tipping or being withdrawn inadvertently from the opening. The stability of the liner is increased by the flange and the flange preferably includes a peripheral, depending skirt which minimizes the effects of a build up of ice adjacent the edge of the opening. The flange also preferably is configured so as to permit an upstanding wind screen to be fitted to and retained by the flange, while permitting adjustment of the wind screen peripherially over the flange so as to deflect snow away from the opening.

BRIEF DESCRIPTION OF THE DRAWINGS

An ice fishing liner according to the invention is disclosed in the accompanying drawings wherein.

DESCRIPTION OF THE PREFERRED EMBODIMENT

Figure 1:
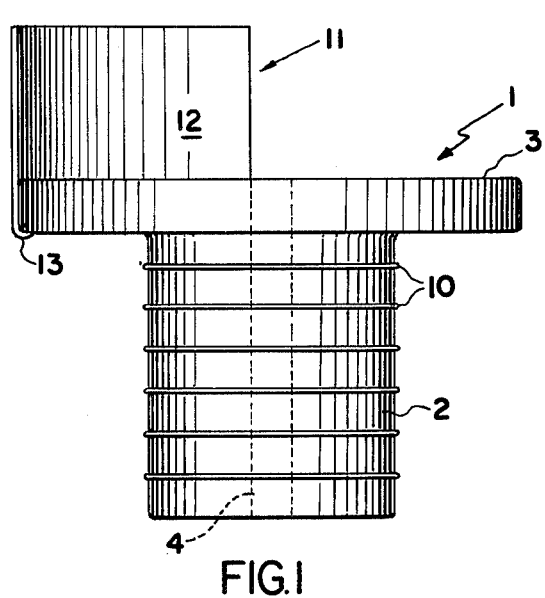
FIG. 1 is a side elevational view of a liner having a wind screen attached.
Figure 2:
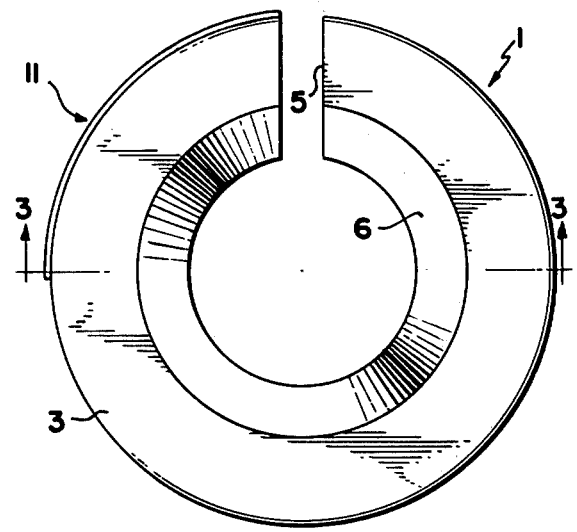
FIG. 2 is a top plan view.
Figure 3:
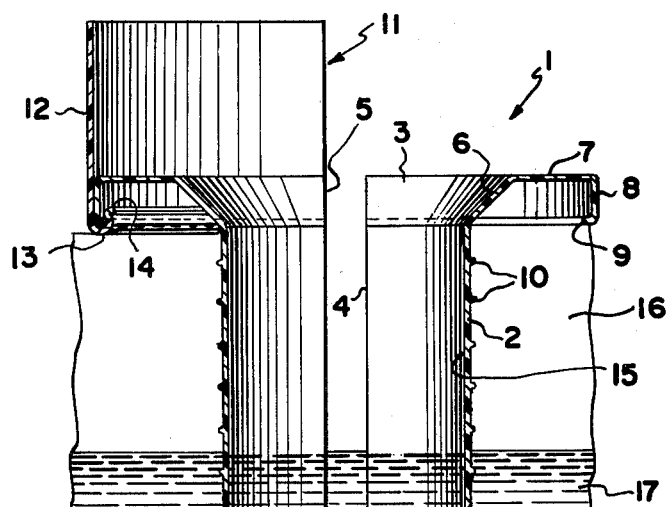
FIG. 3 is a transverse sectional view taken on the line 3—3 of FIG. 2.
Figure 4:
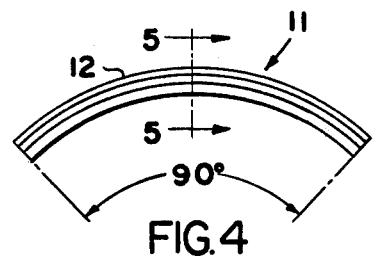
FIG. 4 is a top plan view of the wind screen detached from the liner.
Figure 5:
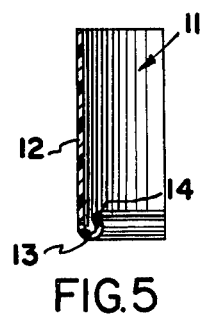
FIG. 5 is a sectional view taken on the line 5—5 of FIG. 4.

A liner constructed in accordance with the disclosed embodiment of the invention is designated generally by the reference character 1 and comprises a cylindrical body 2 joined at one end to a radially projecting flange 3. The body 2 and the flange 3 preferably are integral and are formed from any one of a number of suitable petroleum based plastics which inhibit the adherence of ice thereto. A typical liner has an overall height of about 8.0 inches, the body 2 has an outside diameter of about 6.0 inches, and the flange 3 has an outside diameter of about 9.0 inches. The wall thickness of the body and the flange may be about 0.125 inch. It will be understood, however, that the overall diameter and other dimensions may vary to provide liners adapted for use with different size openings in ice.

The body 2 has an axially extending slot 4 therein and the slot 4 communicates with a radially extending slot 5 formed in the flange 3. Each of the slots 4 and 5 may be about one inch in width.

The flange 3 includes an upwardly and radially outwardly inclined wall section 6 that is joined at one end to the body 2 and is joined at its other end to a flat wall section 7. At the outer periphery of the wall section 7 is a depending skirt 8 having a lower, roller bead or rim 9. The vertical height of the wall portion 6 and the skirt 8 are equal and typically may be 1.25 inches. The head 9 typically may have a diameter of about 0.25 inch.

The inner surface of the body 2 preferably is smooth, but its outer surface is provided with a plurality of circumferentially extending, axially spaced ribs 10, the ribs typically being spaced 1.0 inch apart and protruding about 0.0625 inch beyond the outer surface of the body.

The wall thickness of the body 2 and of the flange 3 should be such that body the body and the flange are capable of radial flexure, and the material from which such members are formed should be sufficiently resilient as to enable the diameters of such members to be reduced by the full extent of the width of the slots 4 and 5. The resilience of the material also should be such that, upon release of a radially compressive force, the members 2 and 3 automatically will expand radially.

The apparatus preferably includes a wind screen 11 comprising an upstanding, arcuate member 12 formed of the same material as the liner 1. The arc on which the member 12 is formed corresponds to that of the skirt 8. One end of the member 12 is rolled inwardly to form a bead 13 capable of accommodating the rim 9 of the skirt 8. The bead 13 terminates in an inclined lip 14 to facilitate mounting the wind screen on the flange 3. When the wind screen is assembled with the flange, the wind screen is slidable circumferentially of the flange.

To condition the liner for use, a fisherman bores or chops an opening 15 through a layer of ice 16 at the surface of a body of water 17. The diameter of the opening 15 preferably is somewhat less than the normal or relaxed diameter of the body 2, thereby necessitating radial contraction of the liner to insert the body 2 in the opening. When the body 2 is inserted within the opening 15, however, release of the liner will enable it to expand radially so as to cause the ribs 10 to engage the side of the opening 15. Since the side of the opening 15 almost invariably is somewhat rough, radial projection of the ribs 10 minimizes any tendency of the body 2 to be withdrawn from the opening, although the body 2 easily may be withdrawn from the opening when desired by applying a radially compressive force on the flange 3.

When the liner 1 is in place in the opening 15, the rim 9 of the skirt 8 will bear against the upper surface of the ice 16 at points several inches outwardly of the opening 15, thereby enabling the flange to have a firm seat inasmuch as the flange will span the boring or chopping debris at the mouth of the opening 15. The liner 1 thus is less inclined to be tipped.

If wind conditions are such as to warrant the use of the wind screen 11, the latter may be fitted to the skirt 8 and located directly upwind relative to the opening 15. The curvature of the member 12 will cause wind and entrained snow to be deflected around the opening. The height and arcuate length of the member 12 may vary, but an overall height of 8 inches and an arcuate length of about 90° has been found satisfactory. The ability of the wind screen to slide upon the skirt enables the screen to be adjusted to its most effective position.

When a fish is hooked and raised through the opening in the ice, the smooth inner surface of the liner body greatly facilitates the removal of the fish from the water and minimizes the possibility that the head of the fish will become snagged on the uneven surface of the opening.

This disclosure is representative of a presently preferred embodiment of the invention, but is intended to be illustrative rather than definitive thereof. The invention is defined in the claims.

I claim:

1. A liner adapted for insertion in an opening in ice, said liner comprising a hollow, generally cylindrical body having a peripheral flange joined to one end thereof, said flange terminating at its periphery in a skirt spaced from said body and extending in a direction toward but terminating well short of the opposite end of said body, said skirt terminating at its free edge in a rolled rim, said body having an axial slot extending the full length of said body, and said flange and said skirt each having a slot therein communicating with one another and with the slot in said body, said body, said flange, and said skirt being formed of material sufficiently resilient to enable radial flexure of said body, said flange, and skirt and vary the width of said slots.

2. A liner according to claim 1 wherein said body has on its exterior a plurality of axially spaced apart, radially projecting beads.

3. A liner according to claim 2 wherein each of said beads is substantially circular.

4. A liner according to claim 1 wherein at the juncture between said body and said flange said flange includes an upwardly and outwardly inclined wall portion.

5. A liner according to claim 4 wherein said inclined wall portion and said skirt are of substantially equal height.

6. A liner according to claim 1 including an arcuate shield member, and means for releasably mounting said shield member on said flange with said shield member extending beyond said flange in a direction opposite that in which said body extends.

7. A liner according to claim 6 wherein said mounting means comprises a rolled flange on said shield member embracing the rim of said skirt.

8. A liner according to claim 6 wherein said shield member defines an arc of less than 180°.

9. A liner according to claim 6 wherein said shield member defines an arc of about 90°.

* * * * *